United States Patent [19]
Tibbett

[11] 3,892,075
[45] July 1, 1975

[54] APPARATUS FOR VORTEX GENERATION TO PRECIPITATE SUSPENDED PARTICLES IN FLUID BODIES

[76] Inventor: Michael Edward Tibbett, 1035 - 33rd St., Vero Beach, Fla. 32960

[22] Filed: Oct. 29, 1973

[21] Appl. No.: 410,788

[52] U.S. Cl. ............................................. 61/4
[51] Int. Cl. ......................................... E02b 3/04
[58] Field of Search ........ 114/665 H; 244/40 A, 41; 61/1 R–5; 256/12.5

[56] References Cited
UNITED STATES PATENTS

| | | | |
|---|---|---|---|
| 1,858,231 | 5/1932 | Parshall | 61/2 |
| 2,080,045 | 5/1937 | Hornsby | 61/2 |
| 2,967,503 | 1/1961 | Unger | 114/66.5 H |
| 3,471,107 | 10/1969 | Ornberg | 244/41 |

FOREIGN PATENTS OR APPLICATIONS

| | | | |
|---|---|---|---|
| 595,877 | 4/1960 | Canada | 244/40 A |
| 9,127 | 2/1908 | United Kingdom | 256/12.5 |

*Primary Examiner*—Trygve M. Blix
*Assistant Examiner*—Jesus D. Sotelo
*Attorney, Agent, or Firm*—Duckworth, Hobby & Allen

[57] ABSTRACT

A vortex generator, for example a delta hydrofoil, is positioned within a fluid body so as to generate vortices and thereby precipitate suspended particles.

6 Claims, 5 Drawing Figures

APPARATUS FOR VORTEX GENERATION TO PRECIPITATE SUSPENDED PARTICLES IN FLUID BODIES

BACKGROUND OF THE INVENTION

1. Field of the Invention

The present invention relates to apparatus and methods for precipitating suspended particulate, and specifically relates to apparatus and methods useful for precipitating eroded sand and soil in bodies of water subject to wave action.

2. Description of the Prior Art

Coastal erosion is a continuing scientific challenge. It is not uncommon for coastlines in some areas to be eroded at a rate of 6 feet a year, and some coastal areas realize an erosion rate as high as 17 feet per year.

Steep storm waves generate the chief forces which cause beach erosion. As these waves reach their breaking point, particularly when reinforced by an on-shore wind, the erosion powers of these waves are greatly increased. The excess water pushed shoreward by the wind and waves flows back to the sea and does so as an undertow that scours the bottom.

More specifically, when waves enter shallow water and begin to be affected by the bottom, the movement of water within each wave changes pattern. As the waveform begins to lose its symmetry on the surface, the hydraulic pressure changes bottom circulation from a circular to an eliptical pattern, and soil along the bottim is scrubbed as the water moves back and forth. The water directly under each wave crest moves forward toward the beach, accelerating as each crest becomes shorter and steeper; but under each trough there is a slower, seaward movement of water before the wave breaks. It is this bottom movement of water beneath the wave which transports sand and other particulate matter and thereby cause erosion.

Various techniques and apparatus have been developed in the prior art for preventing beach erosion. Stanford, in U.S. Pat. No. 1,816,095, discloses various cleat-mounted protrusions mounted along the beach bottom to prevent the seaward movement of sand and other solid matter. In U.S. Pat. No. 2,184,462, Milliken discloses a triangular shaped bulkhead for dissipating the forward energy of wave action. Lange, et al., in U.S. Pat. No. 2,731,799, teach piling-mounted shore protective devices. Riviere teaches, in U.S. Pat. No. 2,931,183, arrangements similar to that taught by Stanford. See also Inman et al., SCIENCE, Volume 181, page 20, July 6, 1973.

The use of vortex generators for aircraft is well known. See for example U.S. Pat. No. 2,800,291 to Stephens.

SUMMARY OF THE INVENTION

The present invention contemplates apparatus comprising positioning vortex generating means in a fluid body.

The vortex generator, which may comprise a delta hydrofoil for example, utilizes the energy of the motion of the fluid body across the leading edges of the hydrofoil to create lateral irrotational motion of the fluid, or vortices, whereby particles suspended in the core of the vortex are precipitated out. This apparatus is useful in preventing erosion of sand and soil on beaches and along the banks of bays and rivers.

Experimental results of the apparatus of the present invention are reported by Ryan in a thesis entitled "The Theory and Application of Vortex Flow For Soil Reclamation and Erosion Prevention", presented to the University of Houston, Department of Civil Engineering in December, 1972.

THE DRAWING

DETAILED DESCRIPTION

A. Hydrofoil Theory

The aerodynamic feature of the delta form which distinguishes it from other hydrofoils is the manner in which the leading edges of the hydrofoil shed vortices. By arranging the angle of attack of the hydrofoil for the highest value of lift-to-drag ratio, a strong vortex can be generated about the leading edge.

Figures 1, 2:
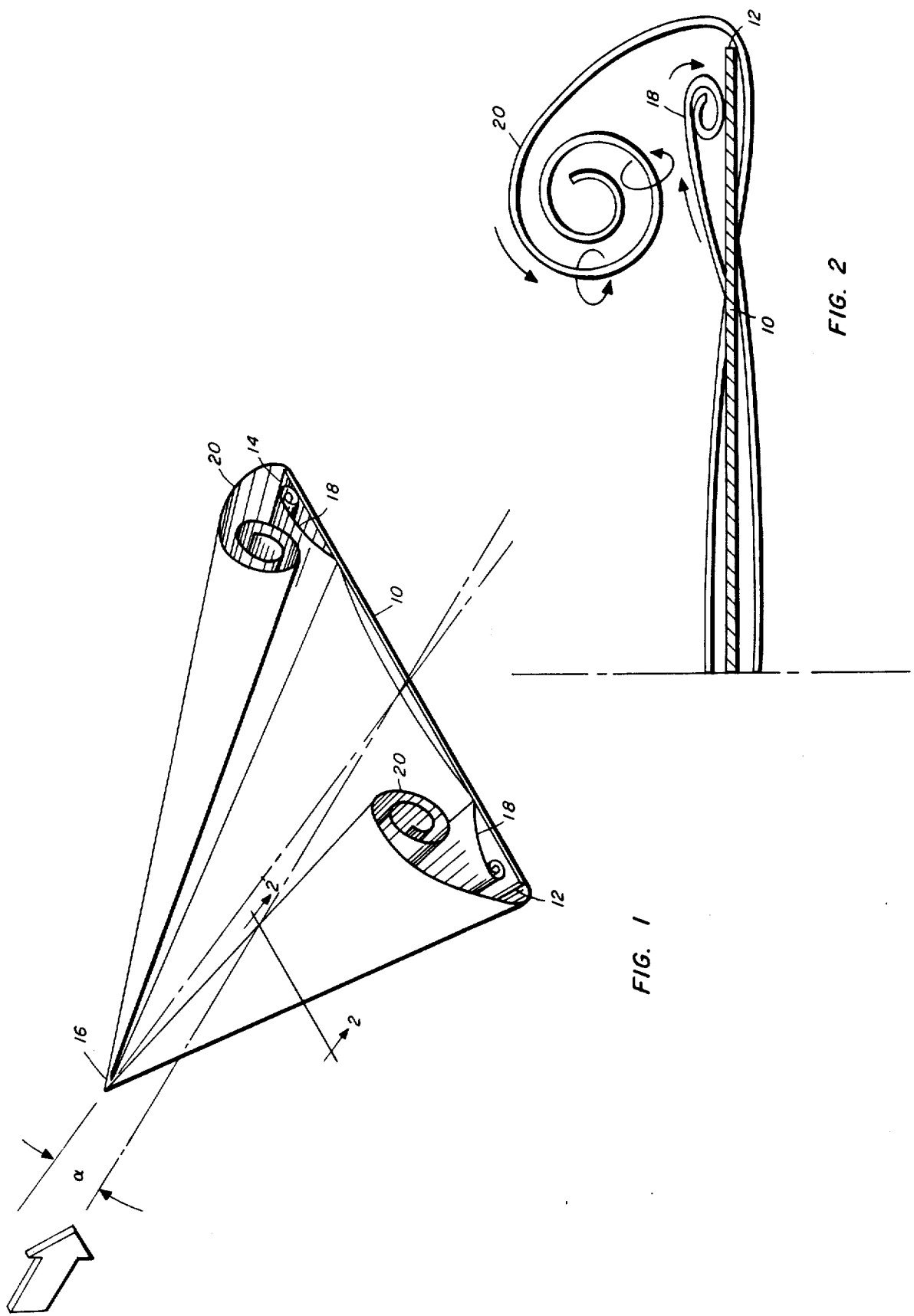
FIG. 1 is a delta hydrofoil positioned in a fluid current, graphically illustrating the vortex formation caused by movement of the fluid across the leading edges of the hydrofoil.
FIG. 2 is a cross secton of a portion of the hydrofoil shown in FIG. 1, taken along the line 2—2'.

The nature of vortex shedding is basically different between a conventional wing and the delta hydrofoil. All characteristics, lift, drag, and pitching moment are substantially different. These differences result from the different vortex sheets shed by each wing. While the Kutta condition is invoked at the trailing edge and tips of the conventional wing, that condition is invoked at the leading edge of a delta hydrofoil. Further, while a conventional wing achieves a variety of vortex shedding patterns from zero lift to stall, the vortex pattern of a delta hydrofoil is stabilized at a small angle of attack and maintains a constant pattern up to the point of stall, merely increasing in strength and shifting position slightly. In the treatise entitled "An Investigation of the Flow Around Slender Delta Wings with Leading-edge Separation", Princeton University Press, Princeton, N.J., May 1960, Borgeson and Porter give a good visual and analytical insight into the specific nature of the flow about a delta hydrofoil. FIG. 1 is adapted from their work, and illustrates the secondary vortex in the accompanying boundary layer separation which lies below an outboard of the primary vortex sheet.

Specifically, the delta hydrofoil 10 includes leading edges 12 and 14 and a tip 16 therebetween pointed in a direction opposite to the direction of fluid flow (note arrow). Fluid flow across the leading edges 14, 16 fully develops a spiral vortex 20 across the leading edges. Similarly, a secondary vortex 18 is fully developed downwardly along the hydrofoil 10 in an outwardly direction.

The circulation components produced about the spiral vortex 20 shed from the leading edges 12, 14 cause an outward flow beneath the conical vortex and a reversal of pressure gradient in the lateral direction. This occurs immediately below the vortex center. The outward vortex flow 18, which is induced by the vortex circulation, encounters the adverse pressure gradient below the vortex. The combination of the spanwise growth of the boundary level and the adverse pressure gradient causes, first, thickening of the boundary layer and, finally, a boundary layer separation along a chordwise line at angles of attack of about 20°. Since the flow is spanwise, the axes of the vortex 20 in the separated flow are chordwise, and, accordingly, the secondary vortex 18 is gradually below, parallel, and outboard of the primary spirally-wrapped vortex 20.

FIG. 2 is a cross-section through the delta hydrofoil, illustrating the double vortex 18, 20.

B. Application of Hydrofoil Theory to Particulate Precipitation

The basis for this invention is the vortex flow mechanism, described above, through which it is possible to separate silt, sand and other suspended particles from fluid bodies and deposit these particles downstream.

In order to generate a vortex, a source and a sink must exist. In this case, the source is the dynamic pressure field of the wave movement and the sink is the low static pressure field of the hydrofoil. With the proper angle of attack, fluid flow over the hydrofoil generates the necessary conditions for producing vortices. Thus, the vortex generator causes the particulate to collect in the core of the vortex, behind the vortex generator trailing edge. Further, the stronger the vortices, the more effective will be soil reclamation; since wave particle velocities increase as surf conditions worsen, the efficiency of the vortex generator improves when needed most.

C. Example

Figure 3:
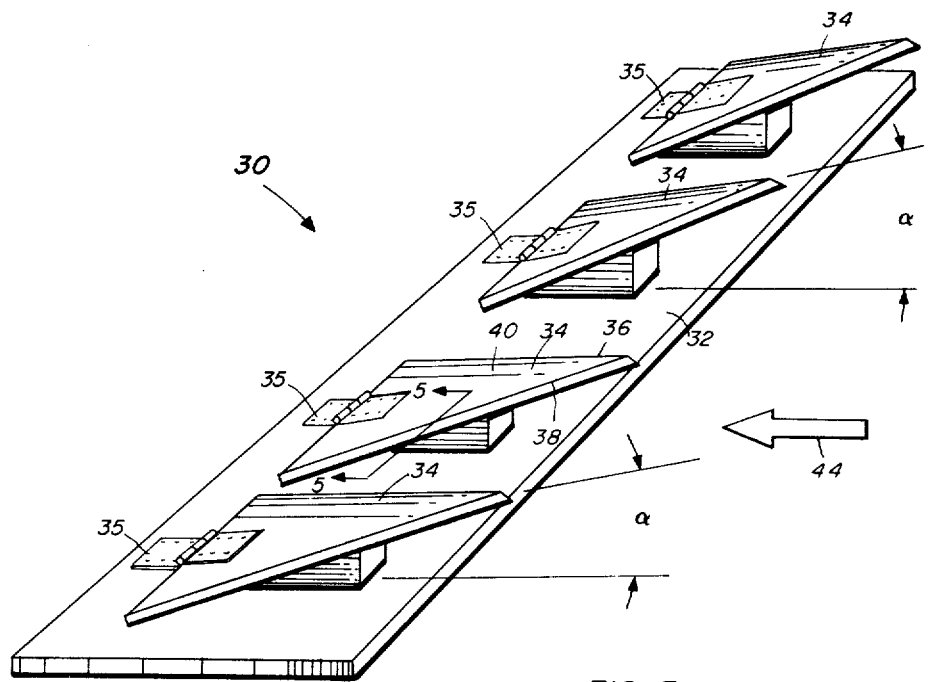
FIG. 3 is a perspective view of a series of vortex generators positioned in a fluid current in accordance with the present invention.
Figure 5:
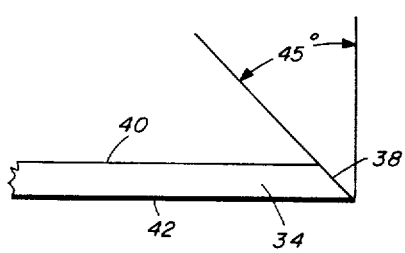
FIG. 5 is a cross section of a portion of the apparatus of FIG. 3, taken through the line 5—5'.
Figure 4:
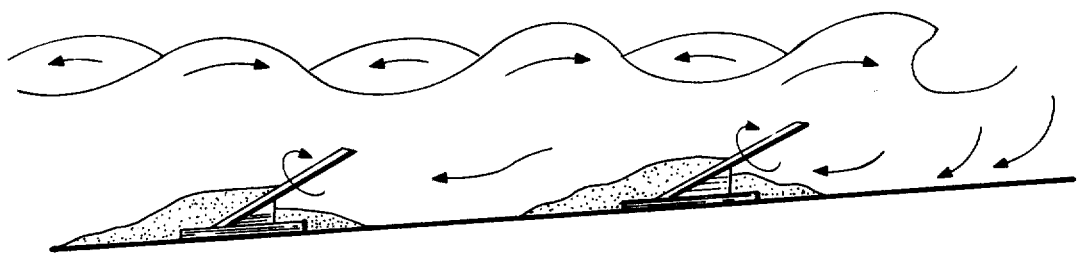
FIG. 4 is a side view of the apparatus shown in FIG. 2 positioned in a body of water.

An example of the vortex generating system for use in precipitating particles suspended in a fluid body is shown in FIGS. 3, 4 and 5 and described with reference thereto.

The system, referred to generally as 30, includes a plurality of vortex generating means mounted on a support platform 32. In this example, each vortex generating means comprises a delta hydrofoil 34 having leading edges 36, 38 beveled at an angle of about 45°, such that the top surface 40 has a lateral dimension less than the corresponding dimension of the bottom surface 42.

Each hydrofoil 34 is positioned on the platform 32 such that the plane of the hydrofoil is at an angle alpha ( $\alpha$ ) with respect to the direction of adjacent fluid flow, as shown by the arrow 44 in FIG. 3. The angle alpha is determined by computing the highest lift-to-drag ratio, and preferably is greater than 25°. The hydrofoils 34 may be mounted by a hinge on a platform 32 with blocks, as is shown in FIG. 3; however, a variety of other mounting techniques may also be employed.

As noted above and as shown in FIG. 4, the apparatus of FIG. 3 is useful in preventing beach erosion. In order to facilitate placement of the hydrofoil system 30 in a submerged position along a beach, the platform 32 preferably comprises a material having a specific density greater than that of sea water. For example, a metal plate or a weighted wooden platform is suitable.

Noting FIG. 4, the hydrofoil system 30 is installed along the bottom at a point just beyond the "breakers", the placement pattern being determined as a function of sea state and other Factors. As the undertow scours the bottom and carries the sand seaward, the water passes over each of the hydrofoils 34 in each system 30, causing the vortex generation described above. This vortex generation then precipitates the sand carried by the water, which is deposited at 50 behind each hydrofoil system 30.

While the delta hydrofoil has been specifically described as a vortex generator, it will be appreciated by those skilled in the art that various other vortex generating platform shapes may be employed to achieve the same objective.

I claim:

1. Apparatus for precipitating particles suspended in a moving fluid body comprising:

a delta hydrofoil vortex generator;

means for supporting said hydrofoil vortex generator from the bottom of said fluid body substantially transverse to the direction of adjacent fluid flow, whereby particles suspended in said moving fluid are precipitated therefrom and deposited on the bottom thereof behind said hydrofoil by vortex generation across said hydrofoil; and wherein said supporting means includes means rendering said delta hydrofoil vortex generator movable responsive to said fluid flow thereby said vortex generator changes its attack angle responsive to said fluid flow to attain a maximum lift-to-drag ratio.

2. Apparatus as recited in claim 1 wherein the leading edges of said delta hydrofoil include an angular bevel such that the top surface has a lateral dimension less than the corresponding dimension of the bottom surface thereof.

3. Apparatus as recited in claim 2 wherein said angular bevel is approximately 45°.

4. Apparatus as recited in claim 1 wherein said supporting means comprises a platform with said delta hydrofoil mounted thereon.

5. Apparatus as recited in claim 4 wherein said supporting means further comprises a hinge joining said hydrofoil to said platform.

6. Apparatus for precipitating particles suspended in a fluid body comprising:

a platform submerged in said fluid body and supported by the bottom thereof;

a delta hydrofoil disposed on said platform;

the leading edges of said hydrofoil having an upward and angular bevel; and wherein said platform includes means for movably supporting said hydrofoil substantially transverse to the direction of adjacent fluid flow so as to attain a maximum lift-to-drag ratio with respect to said fluid flow.

* * * * *